(12) United States Patent
Kemmerling et al.

(10) Patent No.: US 10,036,306 B2
(45) Date of Patent: Jul. 31, 2018

(54) METHOD AND SYSTEMS FOR A CHARGE AIR COOLER BYPASS

(71) Applicant: Ford Global Technologies, LLC, Dearborn, MI (US)

(72) Inventors: Joerg Kemmerling, Monschau (DE); Frank Wunderlich, Herzogenrath (DE); Helmut Matthias Kindl, Aachen (DE); Vanco Smiljanovski, Bedburg (DE); Franz Arnd Sommerhoff, Aachen (DE); Andreas Kuske, Geulle (NL)

(73) Assignee: Ford Global Technologies, LLC, Dearborn, MI (US)

( * ) Notice: Subject to any disclaimer, the term of this patent is extended or adjusted under 35 U.S.C. 154(b) by 112 days.

(21) Appl. No.: 14/962,285

(22) Filed: Dec. 8, 2015

(65) Prior Publication Data

US 2016/0222871 A1 Aug. 4, 2016

(30) Foreign Application Priority Data

Jan. 30, 2015 (DE) .......................... 10 2015 201 619

(51) Int. Cl.
*F02B 29/04* (2006.01)

(52) U.S. Cl.
CPC ...... *F02B 29/0418* (2013.01); *F02B 29/0425* (2013.01); *F02B 29/0437* (2013.01); *Y02T 10/146* (2013.01)

(58) Field of Classification Search
CPC .............. F02B 29/0418; F02B 29/0425; F02B 29/0437; Y02T 10/146
See application file for complete search history.

(56) References Cited

U.S. PATENT DOCUMENTS

| | | | | |
|---|---|---|---|---|
| 2,556,277 | A * | 6/1951 | Hill | B64D 33/08 137/527 |
| 4,713,944 | A * | 12/1987 | Januschkowetz | F25B 17/08 62/239 |
| 5,782,211 | A * | 7/1998 | Kamimaru | F01L 9/04 123/90.11 |
| 7,007,680 | B2 | 3/2006 | Tussing et al. | |
| 2008/0202735 | A1 * | 8/2008 | Geskes | F28D 9/0006 165/166 |

(Continued)

FOREIGN PATENT DOCUMENTS

DE 102008005400 A1 7/2008
DE 102008014170 A1 12/2008

(Continued)

*Primary Examiner* — Brandon Lee
(74) *Attorney, Agent, or Firm* — Julia Voutyras; McCoy Russell LLP

(57) ABSTRACT

The present disclosure concerns a charge cooler with an air cooler in a first air path and with a bypass in a second air path which is connected in parallel to the first air path, wherein a thermal insulation is assigned to the bypass which thermally isolates the bypass from the air cooler, wherein the air cooler has a double-walled base body with an outer wall and with an inner wall, wherein the thermal insulation is arranged on the inner wall. The present disclosure also concerns a valve for such a charge cooler, and a turbocharged internal combustion engine with such a charge cooler, and a motor vehicle with such an internal combustion engine.

17 Claims, 6 Drawing Sheets

(56) References Cited

U.S. PATENT DOCUMENTS

| | | |
|---|---|---|
| 2011/0113775 A1 | 5/2011 | Lilly |
| 2011/0262269 A1* | 10/2011 | Lior ................... F01D 17/10 |
| | | 415/180 |
| 2013/0098033 A1 | 4/2013 | Murakami et al. |
| 2014/0109568 A1 | 4/2014 | Glugla et al. |
| 2014/0202539 A1 | 7/2014 | Landre et al. |

FOREIGN PATENT DOCUMENTS

| | | |
|---|---|---|
| EP | 1913324 B1 | 9/2011 |
| WO | 2011037487 A1 | 3/2011 |

* cited by examiner

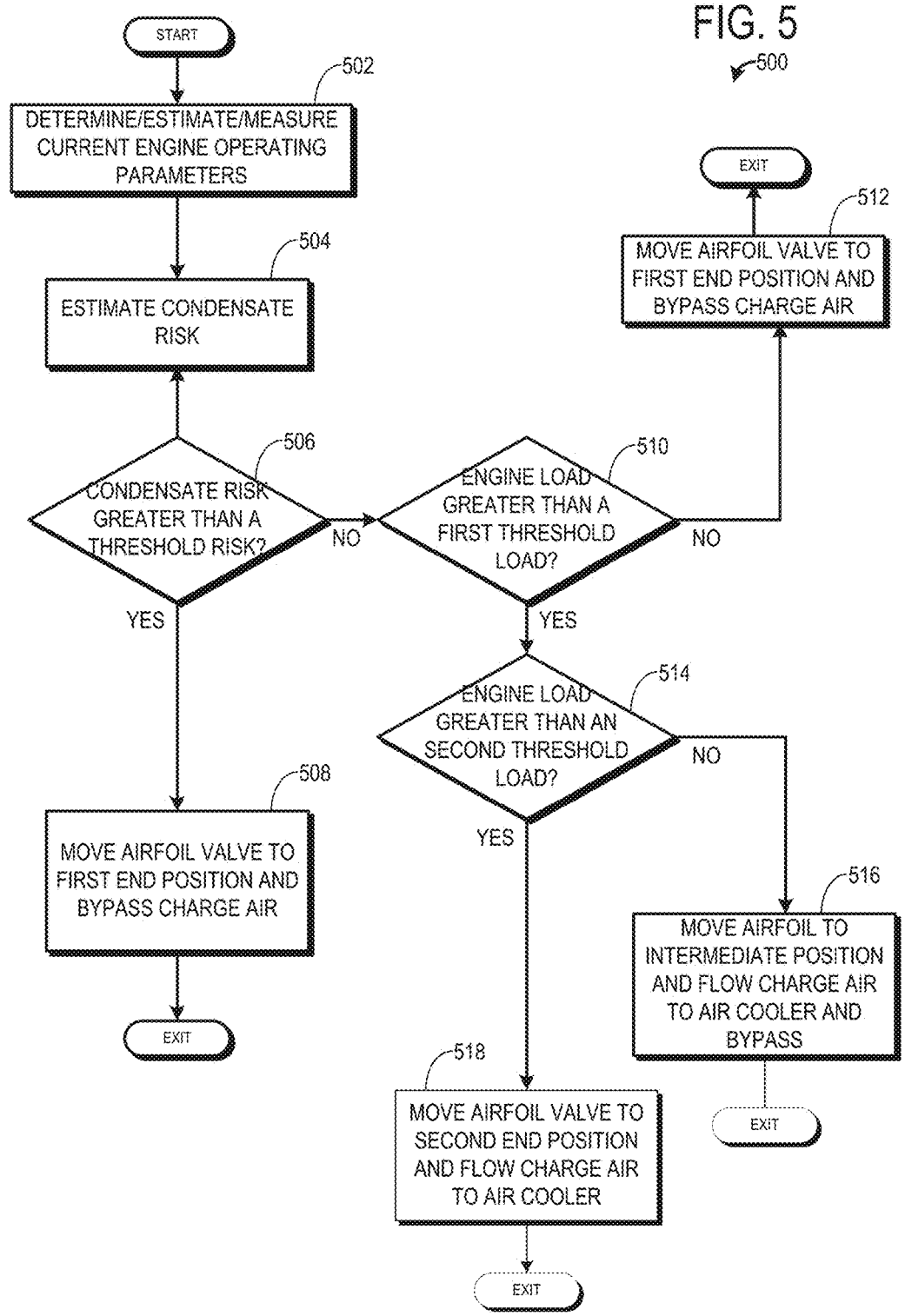

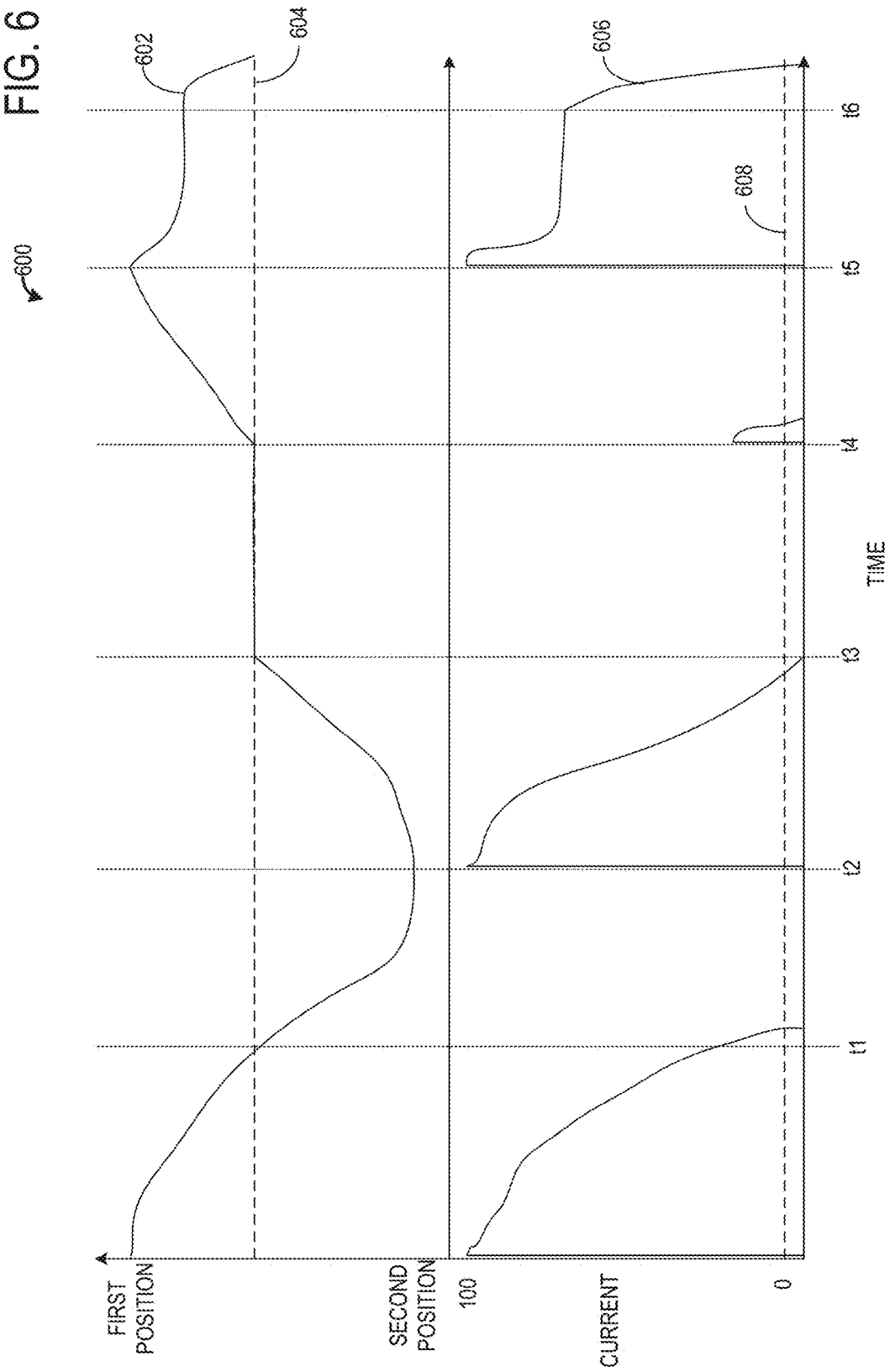

METHOD AND SYSTEMS FOR A CHARGE AIR COOLER BYPASS

CROSS REFERENCE TO RELATED APPLICATION

The present application claims priority to German Patent Application No. 102015201619.6, filed Jan. 30, 2015, the entire contents of which are hereby incorporated by reference for all purposes.

FIELD

The present description relates generally to methods and systems for a charge air cooler with a bypass.

BACKGROUND/SUMMARY

Many internal combustion engines include turbochargers, or superchargers configured to force more air mass into an engine's intake manifold and combustion chamber by compressing intake air with a compressor driven by a turbine disposed to capture energy from the flow of the engine exhaust gas. However, compression may heat the intake air, leading to a reduction of the density of the charge air. It is known to use a charge air cooler (CAC) to compensate for heating caused by supercharging.

During low-load operation in humid and cooler climates, water vapor in the air may condense and store in the CAC. When the flow of intake air reaches a high enough velocity, condensed water may be stripped out of the CAC and ingested into the engine. If too much water is ingested into the engine too rapidly, the engine may misfire which may lead to engine degradation.

The inventors have recognized the above problems and identified various approaches to at least partially address them. In one example, the issues described above may be addressed by a system comprising a CAC with an adjacent bypass, where the bypass is thermally isolated from an air cooler of the CAC. A valve, configured to adjust air flow through one or more of the charge air cooler and the bypass, is pivotable about a shared wall between the air cooler and the bypass. In this way, the valve may route air to the bypass during high humidity and low ambient temperature conditions to mitigate condensate formation in the CAC.

As one example, the air cooler is located along a first path and the bypass is located along a second path parallel to the first path. A shared wall may be located between the first and second paths, where the shared wall is thermally insulated to prevent heat transfer between the two paths. The thermal insulation may be a vacuum element and/or a foam element. A valve configured to adjust an air flow to one or more of the first and second paths is rotatably coupled to the shared wall. In one example, the valve may move to first and second end positions in order to block the first path or second path respectively. The valve may be actuated based on, but is not limited to engine load, ambient temperature, and/or ambient conditions. In one example, the present disclosure may utilize the valve to close off portions of the air cooler during low engine air flow conditions and open the air cooler during high engine air flow conditions. In this way, engine efficiency may be maintained while mitigating condensate formation in the air cooler.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5 shows a method for operating the valve of the charge air cooler.

FIG. 6 shows a plot illustrating a current supplied based on a valve position.

DETAILED DESCRIPTION

Figure 1:
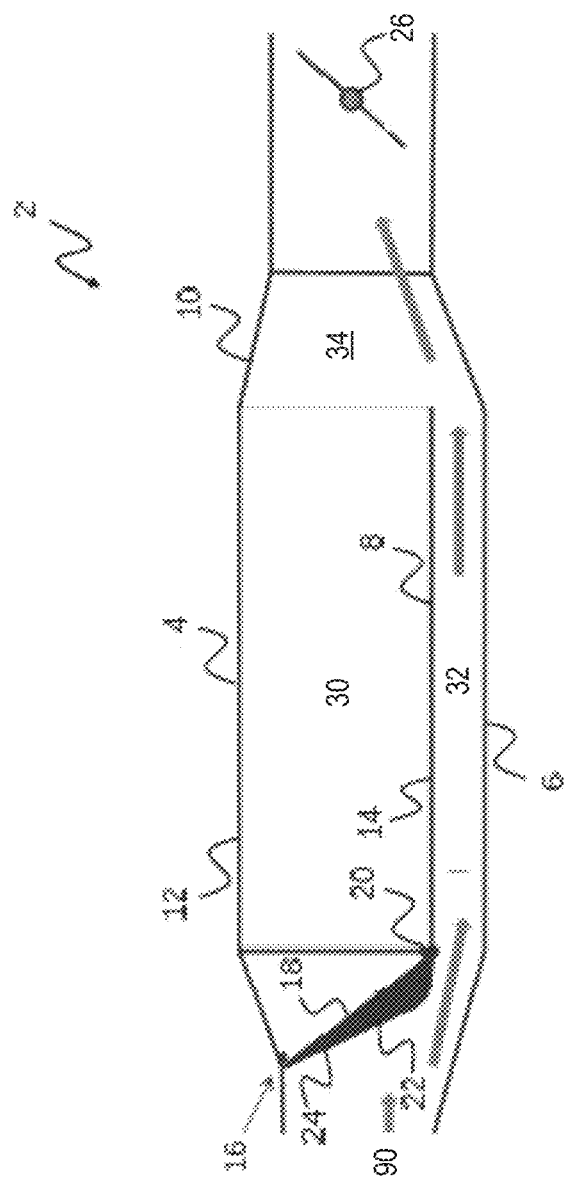
FIG. 1 shows a charge air cooler with a valve in a first end position.
Figure 2:
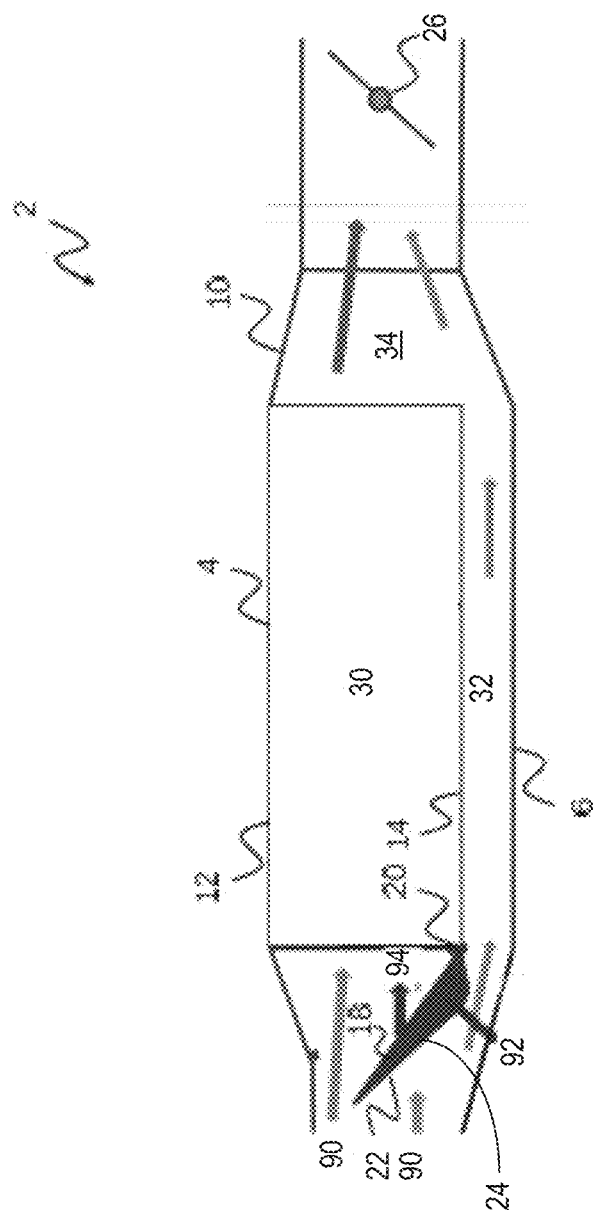
FIG. 2 shows the charge air cooler with the valve in an intermediate position.
Figure 3:
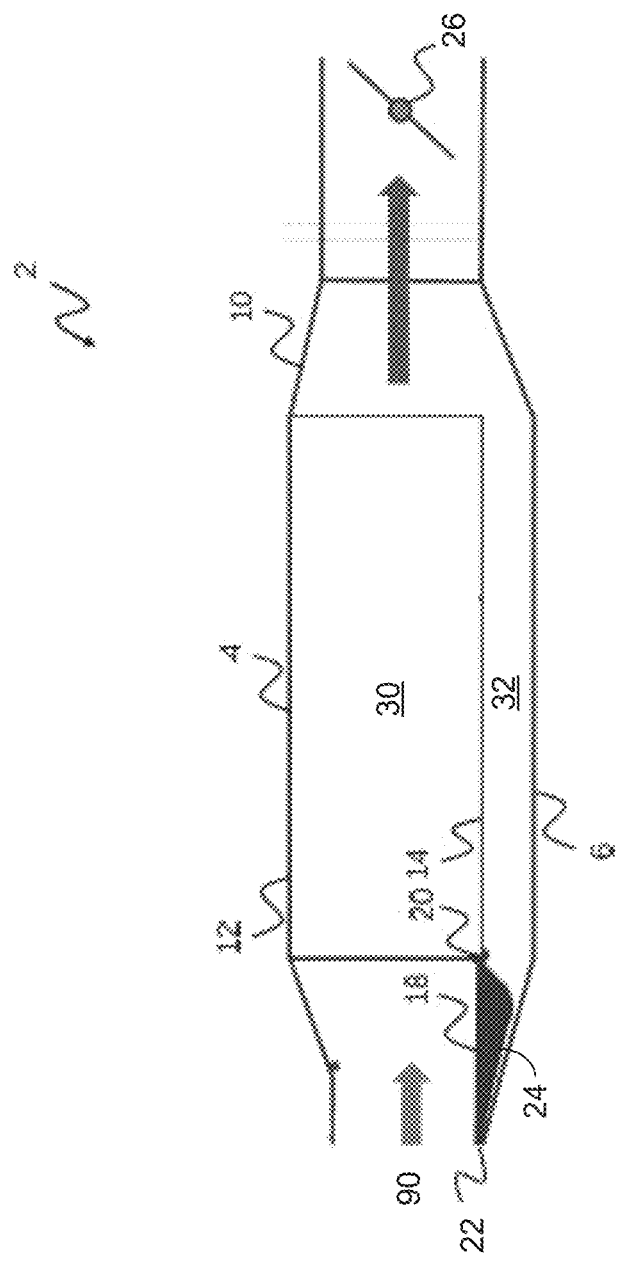
FIG. 3 shows the charge air cooler with the valve in a second end position.
Figure 4:
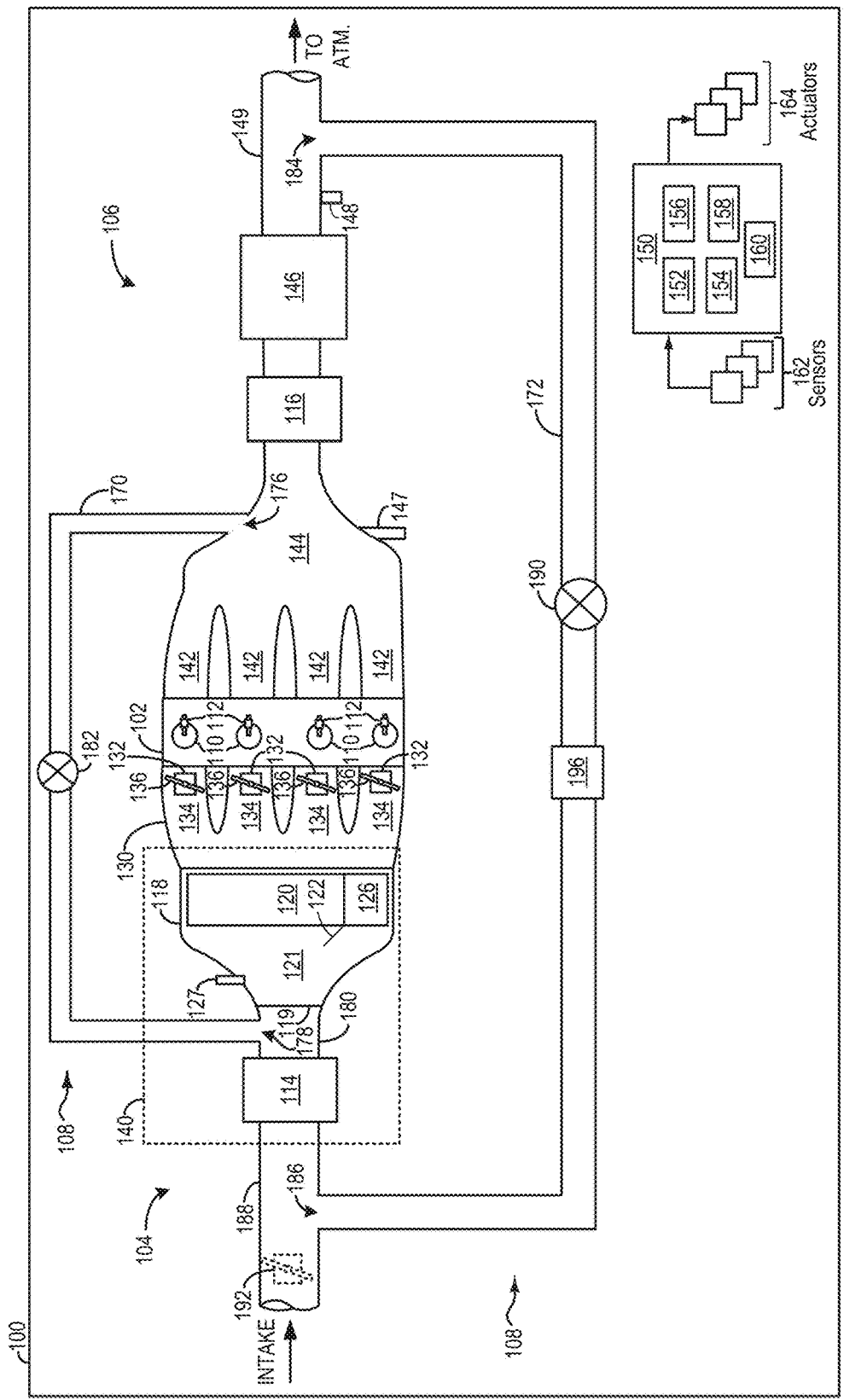
FIG. 4 shows a schematic of an engine with the charge air cooler.

The following description relates to systems and methods for a charge air cooler (CAC) with an intake air cooler in a first air path and a bypass in a second air path which is connected in parallel to the first air path. The CAC further comprising a valve configured to adjust an air flow to one or more of the first and second paths. A first end position (bypass position) of the valve may block intake air flow to the air cooler and flow substantially all of the intake air through the bypass passage, as shown in FIG. 1. An intermediate position of the valve may partially block intake air flow to the air cooler and the bypass passage so that air may flow to the air cooler and the bypass passage simultaneously, as shown in FIG. 2. A second end position (air cooler position) of the valve may block intake air flow to the bypass and flow substantially all of the intake air through the air cooler, as shown in FIG. 3. The CAC is arranged in an inlet tract of an internal combustion engine and may reduce a temperature of intake air supplied to the internal combustion engine, as shown in FIG. 4. The air cooler dissipates part of the heat which results from the compression of the air in the turbocharger or compressor. Cooling the charge air may allow greater fuel to be burned due to more air being provided to one or more engine cylinders, thereby increasing an engine power output. However, during low-load with high humidity and low temperatures, condensate may form in the air cooler due to a temperature of the CAC being below a dew point temperature of water vapor in the charge air. Condensate may accumulate in the air cooler and be swept into one or more engine cylinders during a higher engine load. This may cause an engine misfire. The valve may be adjusted between the first and second positions to abate condensate formation during some conditions as shown in FIG. 5. An electric assistance provided to the valve may be altered based on a valve position, as shown in FIG. 6.

FIG. 1 shows a charge air cooler (CAC) 2 of a charged internal combustion engine, where the engine may comprise one or more of a turbocharger and a supercharger. The CAC 2 has an air cooler 4 and a bypass 6. The air cooler 4 may be an air-to-air or a water-to-air cooler. The air cooler 4 is arranged in a first air path 30 and the bypass 6 is arranged in a second air path 32. The first air path 30 and the second air path 32 originate from a single air path (intake passage) before the single air path bifurcates into the two air paths.

The first air path 30 and the second air path 32 are connected in parallel, so that air can be diverted through the bypass 6 along the second air path 32, bypassing the air cooler 2. Gas in the first air path 30 and the second air path 32 does not mix. A direction of gas flow in the air paths is substantially equal. However, first air 30 and second air 32 paths combine downstream of the air cooler 4 and bypass 6, respectively, at a region of confluence 34, allowing the gases from the two paths to mix.

The CAC 2 has a double-walled base body 10 with an outer wall 12 and an inner wall 14. Along the direction of air flow 90, the base body 10 has portions with round and rectangular cross-sections. The inner wall 14 may comprise a thermal insulation preventing thermal communication between the first air path 30 and the second air path 32. Thus, the inner wall 14 is configured to prevent a heat transfer or extraction of thermal energy from the bypass 6 to the air cooler 4 or vice-versa. In this way, air in the first air path 30 may remain cooler than air in the second air path 32. The thermal insulation may be a vacuum element or a foam element. If the thermal insulation is a vacuum, the inner wall 14 is void of air or any other heat transferring materials and/or gases and has an internal pressure less than a threshold pressure (e.g., less than 1 kPa).

A valve 16 is provided for conducting air along the first air path 30 and/or through the second air path 32. The valve 16 has a closing part 18 fixed on a pivot axis 20 to be displaceable between two end positions. The pivot axis 20 is pivotably coupled to the inner wall 14, where the valve 16 is pivotable about the pivot axis 20. To move the valve 16 between the two end positions, an actuator (e.g., a controller, electric motor, a solenoid, a pneumatic cylinder, etc.) may electrically signal the valve 16 to rotate between the two end positions. This allows simple and rapid displacement of the valve 16 between the two end positions. The valve 16 may be signaled to move based on changing engine load, CAC condensate levels, CAC temperature, ambient humidity, exhaust gas recirculation (EGR) composition, EGR cooler condensate levels, etc. Thus by control of the valve 16, the air flow can be conducted into the first air path 30, the second air path 32, or simultaneously into the two. Alternatively, two valves may also be provided which are opened and closed alternately in order to conduct the air flow into the first 30 and/or second 32 air paths.

The valve 16 is shown in a first end position, where the valve 16 is blocking a flow of intake air to the air cooler 4. Substantially all of the intake air is directed to the bypass 6 (second air path 32) before flowing to an engine. In the first end position, the engine receives hotter air than other positions of the valve 16, as will be described below.

The valve 16 may be an airfoil 22 in one example. The valve 16 may be other suitable shapes without departing from the scope of the present disclosure, for example, a squiggle, a zig-zag, etc. The air foil 22 comprises a first side 18 and a second side 24. In the first end position, the first side 18 faces a downstream direction and the second side 24 faces an upstream direction relative to intake air flow 90. The valve 16 remains in the first end position until the actuator signals the valve 16 to move, as will be described below. The valve 16 is impervious to air flow and guides the intake air flow 90 into the second air path 32, where the intake air flows into the region of confluence 34 upstream of a throttle 26.

FIG. 2 shows the CAC 2 with the airfoil 22 in an intermediate position. Thus, components previously introduced may be similarly numbered in subsequent figures. The intermediate position may be directly between the first end position and a second position, allowing charge air to flow to the air cooler 4 and the bypass 6. In this way, a portion of intake air is cooled while a remaining portion is not cooled. When in the intermediate position, intake mass air flow to the air cooler and the bypass may be substantially equal. In this way, half of an intake air flow is cooled and the other half is not. The two halves may merge at a region of confluence 34 upstream of a throttle before flowing to one or more cylinders of an engine. The air cooler 4 flows intake air along the first air path 30 whereas the bypass 6 flows intake air along the second air path 32. Charge air from the first 30 and second 32 air paths may merge at a region of confluence 34 near an end of the CAC 2 adjacent to a throttle 26. Air in the first air path 30 is thermally isolated from air in the second air path 32 due to the vacuum insulation in the shared wall 14. Air from the air paths merge in the region of confluence 34 where a temperature of air from the first air path 30 is increased and a temperature of air from the second air path 32 is decreased. A temperature of air provided to the engine when the airfoil 22 is in the intermediate position is less than the temperature of air provided to the engine when the airfoil 22 is in the first end position shown in FIG. 1.

As shown, the airfoil valve 22 is nearer to a second end position compared to the airfoil valve 22 of FIG. 1. As the airfoil valve 22 moves from a first end position (shown in FIG. 1) to the intermediate position in a counter-clockwise direction, the airfoil valve 22 experiences an opening force and a momentum force (indicated by arrows 92 and 94 respectively) opposing one another. The opening force may be generated by an actuator electrically actuating the airfoil valve toward the intermediate position in order to allow charge air to flow into the first air path 30 through the air cooler 4. The momentum force may be generated by charge air pressing against the second side 24 of the airfoil valve 22. As the airfoil valve 22 moves from the first end position to the intermediate position, the momentum force incrementally decreases, allowing the airfoil 22 to move with less electric assistance. In other words, an electric assistance provided by the actuator may also incrementally decrease as the airfoil valve 22 moves from one end position to a different end position. At the intermediate position, the opening force and the momentum force may be substantially equal (in a force equilibrium). "Substantially equal" means that the opening force and closing force deviate from each other due to production-induced tolerances by e.g., 3% to 10%. Therefore the actuator may not apply a necessary counterforce (opening force) against the forces caused by the air flow (momentum force). Therefore the actuator can be configured correspondingly smaller and less powerful than actuators used for an entire duration of a valve actuation.

In an example for an airfoil valve moving from a first end position to a second end position or vice-versa, the actuator may no longer provide electric assistance in response to the airfoil valve passing the intermediate position. This may be due to the momentum force of the charge air being greater enough to close the airfoil valve without electric assistance. As a first example, for an airfoil in the intermediate position, if the airfoil moves slightly in the counter-clockwise direction toward a second end position, then the actuator may not power the airfoil movement due to momentum forces generated by the intake air flow naturally moving the valve to the desired position. Similarly, if the airfoil valve moves slightly in the clockwise direction toward the first end position from the intermediate position, then the actuator may not provide electrical assistance due to the momentum forces being capable of moving the airfoil valve without assistance.

FIG. 3 shows the airfoil valve 22 in the second end position where the second air path 32 is blocked from receiving charge air. The first side 18 faces an upstream direction and the second side 24 faces a downstream direction relative to the intake air flow 90. Thus, substantially all the intake air flows through the air cooler 4 along the first air path 30 without flowing through the second air path 32. In this way, charge air flowing to the region of confluence 34 is cooled, resulting in a temperature of air delivered to the engine is cooler than air delivered to the engine for the valve in the first end position or the intermediate position. The airfoil valve 22 may remain in the second end position without electric assistance due to the force provided by the intake air flow. In one example, the throttle valve 26 may be moved to a more closed position due to a greater density of charge air being provided to cylinders of an engine. In another example, the throttle valve 26 may maintain a current position or move to a more open position.

FIG. 4 shows a schematic depiction of a vehicle 100 including an engine 102, an intake system 104, an exhaust system 106, and an exhaust gas recirculation (EGR) system 108. The intake system 104 is configured to provide intake air to cylinders 110 in the engine 102. The engine is depicted as having four cylinders arranged in an inline configuration. However, it will be appreciated that the number of cylinders and/or configuration of the cylinders may be altered in other embodiments. For example, the engine 102 may include six cylinders arranged in a V configuration. The intake system 104 is configured to flow intake air to the cylinders and the exhaust system 106 is configured to receive exhaust gas from the cylinders. Additionally, each of the cylinders 110 may include an ignition device 112 configured to ignite an air fuel mixture in the cylinders 110. Additionally or alternatively, compression ignition may be utilized to ignite the air fuel mixture in the cylinders 110. The engine 102 also includes at least one intake and exhaust valve per cylinder. In one example, the engine 102 may be a turbocharged petrol engine.

The intake system includes a compressor 114. The compressor 114 may be included in a turbocharger having a turbine 116 in the exhaust system 106. The compressor 114 and the turbine 116 are rotatably coupled. However, in other examples the compressor 114 may be rotatably coupled to a transmission in the vehicle, providing what is referred to as supercharging.

The intake system 104 further includes a plenum 118 having a charge air cooler (CAC) 120 integrated therein. The charge air cooler may be used to cool intake air which may be heated via operation of the compressor 114 and the EGR gas delivered to the intake system 104 upstream of the plenum 118. In this way, the boosted volume provided to the engine 102 is reduced. The reduction in boosted volume enables combustion efficiency to be increased in the engine. Furthermore, the reduction in the boosted volume allows for better control of low pressure (LP) exhaust gas recirculation (EGR). Moreover, when the charger air cooler 120 is integrated into the plenum 118 the throttle volume is reduced when compared to intake system having a charger air cooler spaced away from (e.g., separate from) the plenum. As a result, the throttle response is improved. The plenum 118 includes an inlet 119 in fluidic communication with the compressor 114. The plenum 118 further includes a plenum enclosure 121. Thus, the plenum enclosure 121 includes an expansion and the volume of a plenum enclosure expands in a downstream direction. The charge air cooler 120 may be a water-to-air charge cooler and may use coolant to cool intake air. Alternatively, the charge air cooler 120 may be an air-to-air charge cooler and may use ambient air to cool charge air. Bypass 126 is located adjacent to the charge air cooler 120 and is thermally sealed from the charge air cooler by an insulating wall. The insulating wall may comprise a vacuum element, as described above. An airfoil valve 122 is located on a pivoting point on a wall between the charge air cooler 120 and the bypass 126. The valve 122 may be actuated in order to adjust a flow of air through one or more of the bypass and the charge air cooler, as will be described below. In some embodiments, the plenum 118 may be omitted.

The intake system 104 further includes a throttle body 130. The throttle body 130 is adjacent to the charge air cooler 120. However, the throttle body 130 may be spaced away from the charge air cooler 120, in other examples. When the throttle body 130 is positioned downstream of the charger air cooler 120 the throttle response may be improved. The throttle body 130 includes a plurality of throttles (e.g., intake throttles) 132 positioned in a plurality of intake runners 134. Specifically, each of the intake runners 134 has a single throttle positioned therein. Furthermore, each intake runner 134 is in fluidic communication with one of the cylinders 110. In this way, each cylinder has an individual throttle. Each throttle includes a throttle plate 136. Thus, the throttle body 130 includes a throttle plate in each intake of the engine cylinders, in the depicted embodiment. However, in other embodiments an alternate throttle body configuration may be utilized. The throttles 132 are configured to adjust the airflow through each of the runners 134. It will be appreciated that the throttles 132 may be synchronously controlled. That is to say that the throttles 132 may be controlled via a single shaft extending through each of the throttle plates. However, in other examples each throttle may be separately controlled. A controller 150 included in the engine 102 may be used to control operation of the throttles 132.

The compressor 114, plenum 118, and throttle body 130 may be included in an intake assembly 140. Each of the aforementioned components may be coupled directly downstream of one another in consecutive order. For example, the compressor 114, plenum 118, and throttle body 130 may be coupled directly downstream of one another with no additional components positioned between the consecutive components (e.g., the plenum is directly coupled to the throttle body without any additional components positioned between the plenum and throttle body). However, in other examples just the plenum 118 and the throttle body 130 may be included in the intake assembly 140.

The exhaust system 106 includes a plurality of exhaust runners 142 in fluidic communication with the cylinders 110 and an exhaust manifold 144. The turbine 116 is positioned downstream of the exhaust manifold 144 in the exhaust system 106. Additionally, an emission control device 146 is positioned downstream of the turbine 116. The turbine 116 is rotatably coupled to the compressor 114. A shaft or other suitable component may be utilized to couple the turbine 116 and the compressor 114. However, in other examples the turbine 116 may be omitted from the engine and rotational energy from a transmission in the vehicle 100 may be used to provide rotational energy to the compressor 114. A pressure sensor 147 may be coupled to the exhaust manifold 144. An oxygen sensor 148 may be coupled to a conduit 149 upstream of the emission control device 146.

The EGR system 108 may include at least one of a high pressure EGR loop 170 and a low pressure EGR loop 172. The charge air cooler 120 allows for better control of low pressure EGR loop 170 and improves the cooling of the high pressure EGR loop 172. The high pressure EGR loop 170 includes an inlet 176 opening into the exhaust manifold 144 and an outlet 178 opening into a conduit 180 fluidly coupling the compressor 114 to the plenum 118. In some examples, conduit 180 may be the outlet of the compressor 114. A valve 182 may be included in the high pressure EGR loop 170. In an open position, the valve 182 is configured to enable gas to flow through the high pressure EGR loop 170. In a closed position, the valve 182 is configured to substantially inhibit gas from flowing through the high pressure EGR loop 170. The low pressure EGR loop 172 includes an inlet 184 opening into the conduit 149 and an outlet 186 opening into a conduit 188 upstream of the compressor 114 in the intake system 104. A valve 190 may be included in the low pressure EGR loop 172. It will be appreciated that the delay in the low pressure EGR loop 172 may be reduced when the charge air cooler 120 is integrated into the plenum 118 due to the decreased distance between the outlet of the low pressure EGR loop 172 and the throttle body 130. A throttle 192 may also be positioned in the conduit 188. In an open position, the valve 190 is configured to enable gas to flow through the low pressure EGR loop 172. In a closed position, the valve 190 is configured to substantially inhibit gas from flowing through the low pressure EGR loop 172. In this way, gas may be flowed from the exhaust system 106 to the intake system 104 via the high pressure EGR loop 170 and the low pressure EGR loop 172. For both the high pressure EGR loop 170 and the low pressure EGR loop 172, cooler(s) (EGR cooler 196) may be included to provide initial EGR cooling before the mixed air and EGR gases traverse the charge air cooler.

Controller 150 is shown in FIG. 1 as a conventional microcomputer including: microprocessor unit 152, input/output ports 154, read-only memory 156, random access memory 158, keep alive memory 160, and a conventional data bus. Controller 150 is shown receiving various signals from sensors 162 coupled to engine 102, such as a pressure sensor 127, pressure sensor 147, and oxygen sensor 148. The controller 150 may be configured to send signals to actuators 164 such as throttles 132, valve 182, valve 190, and throttle 192.

FIG. 5 shows a method 500 for operating an airfoil valve (airfoil valve 22 of FIGS. 1, 2, and 3). Instructions for carrying out method 500 may be executed by a controller (controller 150 of FIG. 4) based on instructions stored on a memory of the controller and in conjunction with signals received from sensors of the engine system, such as the sensors described above with reference to FIG. 4. The controller may employ engine actuators of the engine system to adjust engine operation, according to the methods described below.

The method 500 begins at 502, where the method determines, estimates, and/or measures current engine operating parameters. Current engine operating parameters may include but are not limited to engine load, vehicle speed, manifold vacuum, intake air humidity, ambient temperature, engine temperature, EGR mass air flow, and air/fuel ratio.

At 504, the method 500 includes determining a condensate risk (likelihood of condensate forming). The condensate risk may be based on an engine temperature, ambient temperature, ambient humidity, EGR composition, weather conditions, etc. The condensate risk may increase in response to the engine temperature being less than a threshold temperature, where the threshold temperature is based on a dew point of water vapor. The condensate risk may increase as the ambient humidity increases. If an amount of water in EGR and/or an amount of condensate in an EGR cooler increases, then the condensate risk may also increase.

At 506, the method 500 determines if the condensate risk is greater than a threshold risk based on the factors described above. The threshold risk may be based on an amount of condensate in an air cooler capable of causing an engine misfire. If the condensate risk is greater than the threshold risk, then the method 500 proceeds to 508 to move the airfoil valve to a first end position and bypass the intake air without flowing the intake air to the air cooler. As described above, the bypass and the air cooler are adjacent to each other and separated by a thermally insulated wall. In one example, the valve may be actuated from a second end position to the first end position, wherein an actuator may provide electrical assistance until a threshold position, wherein the threshold position is directly downstream of the intermediate position based on a starting point of the valve. For example, if the valve is moving from the first end position to the second end position, the threshold position is located directly downstream of the intermediate position on a side of the intermediate position nearer to the second end position. Intake air may generate a momentum force, which may close the valve without electrical assistance once the valve has reached the position slightly past the intermediate position. Furthermore, the electric assistance provided by the actuator may be gradually decrease from the second end position to the position slightly past the intermediate position due to a counter momentum force decreasing as the valve moves to the intermediate position.

If the condensate risk is not greater than the threshold risk, then the method 500 proceeds to 510 to determine if the engine load is greater than a first threshold load. The first threshold load may be based on a low engine load. If the engine load is not greater than the first threshold load, then the method 500 proceeds to 512 to move the airfoil valve to the first end position and bypass charge air. During low engine load operation for an engine comprising a turbocharger, charge air cooling may not be desired due to low compressor rotation speeds only slightly compressing intake air, resulting in slightly heated intake air. The slightly compressed intake air may not be hot enough to desire cooling. Thus, the airfoil valve may be moved to the first position in order to bypass the air cooler and preserve an intake air temperature. If intake air is over-cooled, then an engine combustion stability may be decreased.

If the engine load is greater than the first threshold load, then the method 500 proceeds to 514 to determine if the engine load is greater than a second threshold load. The second threshold load may be based on a high engine load. If the engine load is not greater than the second threshold, then the engine may be in a mid-load and the method 500 proceeds to 516 to move the airfoil valve to the intermediate position and flow charge air to the air cooler and the bypass. The actuator may be disabled (does not provide electric assistance) when the airfoil valve is in the intermediate position due to a closing pressure and a momentum pressure being substantially equal. When in the intermediate position, intake mass air flow to the air cooler and the bypass may be substantially equal. In this way, half of an intake air flow is cooled and the other half is not. The two halves may merge at a region of confluence upstream of a throttle before flowing to one or more cylinders of an engine.

Additionally or alternatively, the intermediate position may be used to controllably sweep condensate out of the air cooler and/or the EGR cooler to decrease a condensate load in the coolers. A small amount of condensate may be swept from the coolers to the engine while maintaining a desired engine combustion stability. In this way, the method may mitigate formation of condensate and decrease a current level of condensate.

As described above, a small amount of electric assistance from the actuator to the airfoil valve in the intermediate position may move the airfoil valve to the first or second end positions due to the momentum force naturally moving the valve in the same direction without further electrical assistance. Thus, if the airfoil valve is moving from the first end position to the second end position or vice-versa, the actuator no longer provides electrical assistance for an airfoil valve at a position downstream of the intermediate position.

If the engine load is greater than the second threshold load, then the engine may be in a high-load and the method 500 proceeds to 518 to move the airfoil valve to the second end position to block the bypass and flow intake air to the air cooler. In this way, all of the intake air is cooled by the air cooler. This may be desired due to high compressor speeds at high-load leading to increased compression of the intake air leading to high intake air temperatures.

FIG. 6 shows an operating sequence 600 illustrating example results for a valve moving to and from first and second end positions. Line 602 represents a valve position, dashed line 604 represents an intermediate position of the valve directly between the first end position and the second end position, line 606 represents an amount of electrical assistance (current), and line 608 represent a threshold current value, where the threshold current value is equal to a value of "0". For line 606, a value of "100" represents a maximum amount of current and a value of "0" represents no current.

Prior to t1, the valve is in the first position and blocking the flow of intake air to the air cooler. Thus, substantially all the intake air flows to the bypass. The valve is signaled to move to the second end position via a controller based on one or more of the engine conditions described above with respect to FIG. 5. As an example, the engine load may increase from a low load to a high load, thus signaling for the valve to move from the first end position to the second end position. The valve pivots in a counter-clockwise direction via electrical assistance (current) provided by an actuator (e.g., controller 150). As the valve moves toward the intermediate position (between the first and second end positions), shown by lines 602 and 604 respectively, the current supplied to the valve gradually decreases due to a momentum force generated by intake air flow also decreasing, shown by line 606. Furthermore, mass air flow to the bypass decreases and mass air flow to the air cooler increases as the valve moves from the first end position to the intermediate position.

At t1, the valve reaches the intermediate position, where mass air flow to the air cooler and the bypass is substantially equal. As described above, the valve may be in a pressure equilibrium at the intermediate position such that the valve may be maintained in the intermediate position without current being supplied. However, current remains active in order to actuate the valve past the intermediate position to the second end position. After t1 and prior to t2, the current decreases to a current value below the threshold current value 608 (current is no longer supplied) following the valve be actuated slightly outside of the intermediate position toward the second end position. The valve pivots via assistance from the momentum force generated by the intake air flow. As the valve rotates from the intermediate position to the second end position, mass air flow to the bypass passage decreases and mass air flow to the air cooler correspondingly increases.

At t2, the valve is in the second end position where intake air flows through the air cooler without flowing through the bypass passage. The valve is signaled to move from the second end position to the intermediate position due to condition changes described above with respect to FIG. 5. In one example, the valve may move from the second end position to the intermediate position due to one or more of an engine load shift from high-load to mid-load and a desired intake air cooling in conjunction with a moderate risk for condensate formation. In this way, the valve may be actuated to allow less air to the air cooler as the condensate risk increases. After t2 and prior to t3, the valve is actuated toward the intermediate position. This includes pivoting the valve in a clockwise direction with current being supplied to the valve. The amount of current decreases in conjunction with the decrease in momentum force generated by the intake air flow as the valve approaches the intermediate position.

At t3, the valve is in the intermediate position and the current is shut-off. The valve is in a pressure equilibrium due to mass air flow to both the air cooler and the bypass passage being substantially equal. After t3 and prior to t4, the valve remains in the intermediate position.

At t4, the valve is signaled to move to the first end position from the intermediate position due to one or more of an engine load decreasing from mid-load to low-load, intake air cooling no longer being desired, condensate risk being greater than the threshold risk, EGR cooler condensate level being greater than a threshold condensate level, etc., as described above. After t4 and prior to t5, a small amount of current (slightly above the threshold current) is supplied to the valve to move it slightly outside of the intermediate position toward the first end position where the momentum force of the intake air flow may move the valve to the first end position without electrical assistance.

While in the intermediate position, current applied to an actuator coupled to the valve for positioning the valve may be below the threshold current (shut-off). The inertial (momentum) and lift flow (opening) forces may be substantially balanced such that little to no current is required to maintain valve position. Such valve operation may be referred to as having bi-stable positions (the intermediate position as well as each of the two end positions). To then move the valve away from the intermediate position, actuator current may be applied above the threshold current only temporarily to initiate movement of the valve, with the now unbalanced momentum (air flow) forces continuing to move the valve to the end position toward which the initial movement was initiated. In this way, electrical assistance to the valve is disabled in response to the valve being downstream of the intermediate position and moving toward a desired end position, the valve continuing to move toward the desired end position even when the electrical assistance is disabled. Such operation may conserve electrical power and decrease a size of the actuator.

At t5, the valve in the first end position is signaled to move to a position between the first end position and the intermediate position. This may be due to an engine load increasing to a load between a low-load and a mid-load, a condensate risk decreasing, and/or the engine demanding intake air to be cooled. After t5 and prior to t6, the valve is turned counter-clockwise to the position between the first end position and the intermediate position, where the bypass passage receives a greater amount of intake air than the air cooler. The current is constant in order to maintain the valve at the position due to the momentum force of the intake air countering a force of the valve provided by the current. In this way, the valve may be held at any position between the first and second end positions allowing a spectrum of air flows through the air cooler and bypass passage.

At t6, the valve is signaled to move the intermediate position. The current provided decreases as the valve moves toward the intermediate position. The current is disabled after t6 once the valve reaches the intermediate position.

In this way, a compact, easy to manufacture charge air cooler may be used to mitigate condensate formation while providing charge air cooling when desired via a single valve controlling intake air flow to an air cooler and a bypass. The bypass and air cooler are thermally separated via a shared wall with a thermal insulating element located therein. A shape of the airfoil valve may promote actuation from a first end position to a second end position or vice-versa with minimal electric assistance from an actuator. The technical effect of the charge air cooler with the airfoil valve and the bypass is to decrease a profile of the charge air cooler to reduce packaging constraints while also decreasing a likelihood of condensate formation in the charge air cooler.

A charge cooler comprising an air cooler in a first air path and a bypass in a second air path which is connected in parallel to the first air path, a thermal insulation is coupled to the bypass thermally isolating the bypass from the air cooler, the air cooler has a double-walled base body with an outer wall and an inner wall, and where the thermal insulation is arranged in the inner wall. A first example of the charge air cooler further comprising the thermal insulation comprises a vacuum element. A second example of the charge cooler optionally includes the first example further includes the thermal insulation comprises a foam filling. A third example of the charge cooler including one or more of the first and second examples further includes a valve is configured to be displaceable between two end positions in order to control an air flow through the first air path and the second air path. A fourth example of the charge air cooler including one or more of the first through third examples further includes the valve being actively connected to an actuator for displacement between the two end positions. A fifth example of the charge air cooler including one or more of the fourth through first examples further includes the valve being pivotable about an axis. A sixth example of the charge air cooler includes one or more of the first through fifth examples and further includes the valve being configured to convert the air flow into an opening force for opening the first air path or a momentum force for closing the second air path. A seventh example of the charge air cooler includes one or more of the first through sixth examples further includes the valve having an airfoil shape. An eighth example of the charge air cooler includes one or more of the first through seventh examples further includes the valve being configured to convert the air flow into a momentum force for closing the first air path or an opening force for opening the second air path. A ninth example of the charge air cooler includes one or more of the first through eighth examples further includes the valve comprises a rebound surface for converting the air flow. A tenth example of the charge air cooler includes one or more of the first through ninth examples further includes the opening force being substantially equal to the momentum force for a valve in an intermediate position, wherein the intermediate position is a valve position directly between the first end position and the second end position.

A method comprising bypassing air around an air cooler when a valve is in a first end position without flowing any air through the air cooler, flowing air through the air cooler when the valve is in a second end position, and flowing air to both the air cooler and a bypass passage when the valve is in an intermediate position. While in the intermediate position, current applied to an actuator coupled to the valve for positioning the valve may be below the threshold current (shut-off). The inertial (momentum) and lift flow (opening) forces may be substantially balanced such that little to no current is required to maintain valve position. Such valve operation may be referred to as having bi-stable positions (the intermediate position as well as each of the two end positions). To then move the valve away from the intermediate position, actuator current may be applied above the threshold current only temporarily to initiate movement of the valve, with the now unbalanced momentum (air flow) forces continuing to move the valve to the end position toward which the initial movement was initiated. Such operation may conserve electrical power and decrease a size of the actuator. A first example of the method further includes where actuating the valve includes an actuator electrically assisting the valve from the first end position to the second end position or vice-versa. A second example of the method optionally including the first example further includes disabling electrical assistance to the valve in response to the valve being downstream of the intermediate position and moving toward the second end position from the first end position, the valve continuing to move toward the second end position even when the electrical assistance is disabled. A third example of the method optionally includes one or more of the first and second examples and further includes the valve in the intermediate position is defined by an air mass flow to the air cooler and the bypass passage being substantially equal. A fourth example of the method optionally includes one or more of the first through third examples further includes air in the bypass passage is thermally separated from air in the air cooler via a separating wall.

A system comprising a turbocharged engine, a charge air cooler comprising an air cooler adjacent to a bypass passage with a separating wall, thermally separating the air cooler and the bypass passage, located therebetween and an airfoil valve pivotably coupled to the separating wall configured to adjust an intake air flow to the air cooler and the bypass passage. A first example of the system optionally includes where air in the bypass passage is separated from air in the air cooler. A second example of the system optionally including the first example further includes the air cooler is a water-to-air cooler. A third example of the system optionally including the first and/or second examples further includes the air cooler is an air-to-air cooler.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A charge cooler comprising:
   an air cooler in a first air path, a bypass in a second air path which is connected in parallel to the first air path, wherein a thermal insulation is coupled to the bypass which thermally isolates the bypass from the air cooler, wherein the air cooler has a double-walled base body with an outer wall and an inner wall, wherein the thermal insulation is arranged on the inner wall, and an airfoil valve coupled to the inner wall is configured to be displaceable between two end positions in order to control an air flow through the first air path and the second air path, wherein an outwardly curved side of the valve faces an intake flow in a first end position to block flow of intake air to the air cooler, where a peak thickness corresponds with an apex of the valve, both being closer to a pivoting end than a free end of the valve.

2. The charge cooler of claim 1, wherein the thermal insulation comprises a vacuum element.

3. The charge cooler of claim 1, wherein the thermal insulation comprises a foam filling.

4. The charge cooler of claim 1, wherein the valve is actively connected to an actuator for displacement between the two end positions.

5. The charge cooler of claim 1, wherein the valve is pivotable about an axis.

6. The charge cooler of claim 1, wherein the valve is configured to convert the air flow into an opening force for opening the first air path or a momentum force for closing the second air path.

7. The charge cooler of claim 1, wherein the valve is configured to convert the air flow into a momentum force for closing the first air path or an opening force for opening the second air path.

8. The charge cooler of claim 7, wherein the opening force is equal to the momentum force for the valve in an intermediate position, wherein the intermediate position is a valve position directly between the first end position and the second end position, and where the free end of the valve opposite the pivoting end of the valve is spaced away from all exhaust path walls in the intermediate position.

9. A method comprising:
   bypassing air around an air cooler when an airfoil valve is in a first end position, with a lower camber, first side of the valve facing the air cooler and an upper camber, second side of the valve facing an intake air flow, without flowing any air through the air cooler;
   flowing air through the air cooler when the valve is in a second end position where the second side faces a bypass passage; and
   flowing air to both the air cooler and the bypass passage when the valve is in an intermediate position, where a free end of the valve opposite a pivoting end of the valve is spaced away from all exhaust path walls in the intermediate position.

10. The method of claim 9, wherein actuating the valve includes an actuator electrically assisting the valve from the first end position to the second end position or vice versa.

11. The method of claim 10, further comprising disabling electrical assistance to the valve via the actuator in response to the valve being between the second end position and the intermediate position and moving toward the second end position from the first end position, the valve continuing to move toward the second end position even when the electrical assistance is disabled.

12. The method of claim 9, wherein the valve in the intermediate position is defined by an air mass flow to the air cooler and the bypass passage being equal.

13. The method of claim 12, wherein air in the bypass passage is thermally separated from air in the air cooler via a separating wall.

14. A system comprising:
   a turbocharged engine;
   a charge air cooler comprising an air cooler adjacent to a bypass passage with a separating wall, thermally separating the air cooler and the bypass passage, located therebetween;
   an airfoil valve pivotably coupled at a wide end of the valve to the separating wall, with a lower camber, first side of the valve facing toward the air cooler and an upper camber, second side of the valve facing toward the bypass passage and configured to adjust an intake air flow to the air cooler and the bypass passage, where a peak thickness corresponds with an apex of the valve, both being closer to a pivoting end than a free end of the valve.

15. The system of claim 14, wherein air in the bypass passage is separated from air in the air cooler.

16. The system of claim 14, wherein the air cooler is a water-to-air cooler.

17. The system of claim 14, wherein the air cooler is an air-to-air cooler.

* * * * *